Aug. 4, 1936.     G. A. LYON     2,049,462
TIRE COVER CONSTRUCTION
Filed April 30, 1934     2 Sheets-Sheet 2
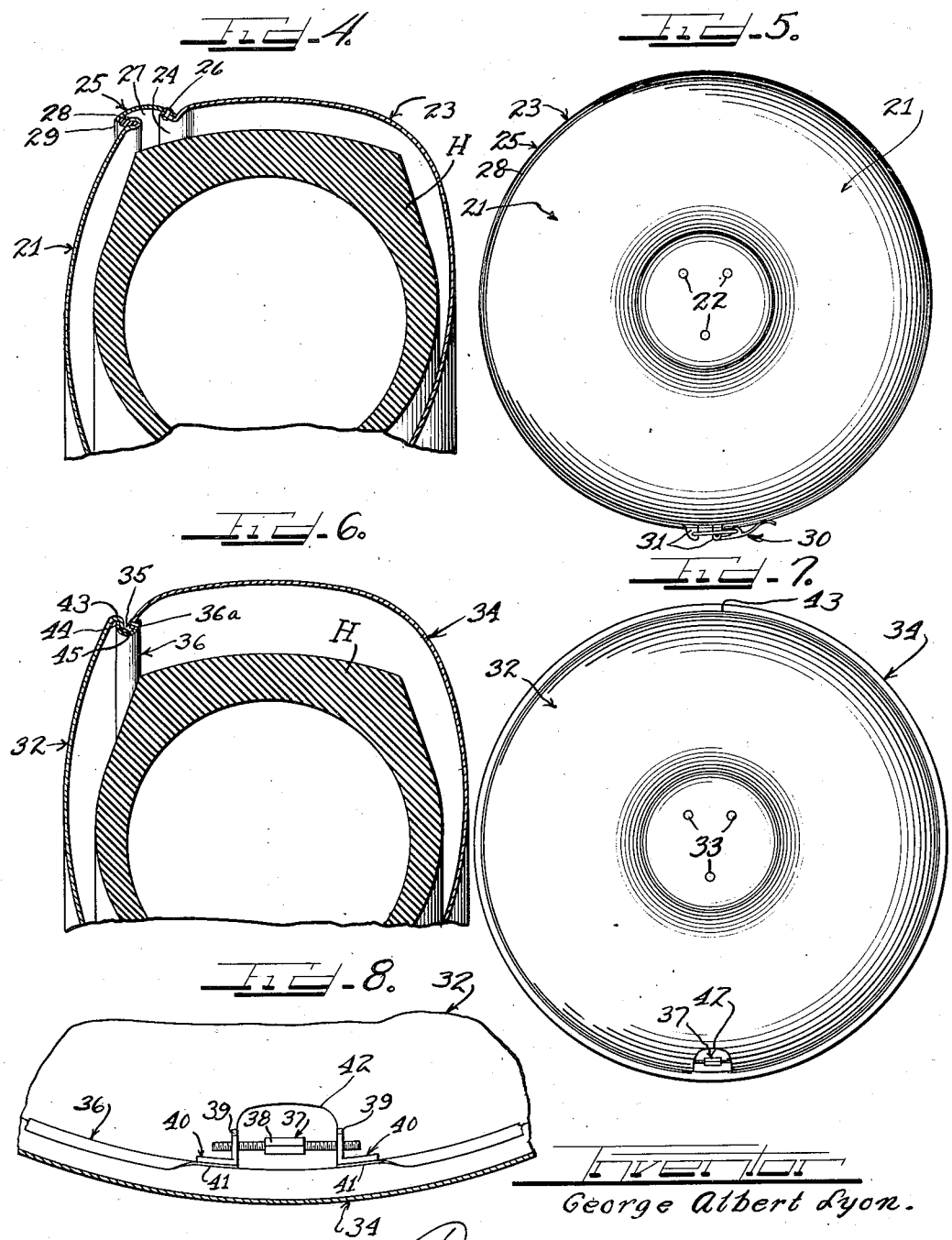

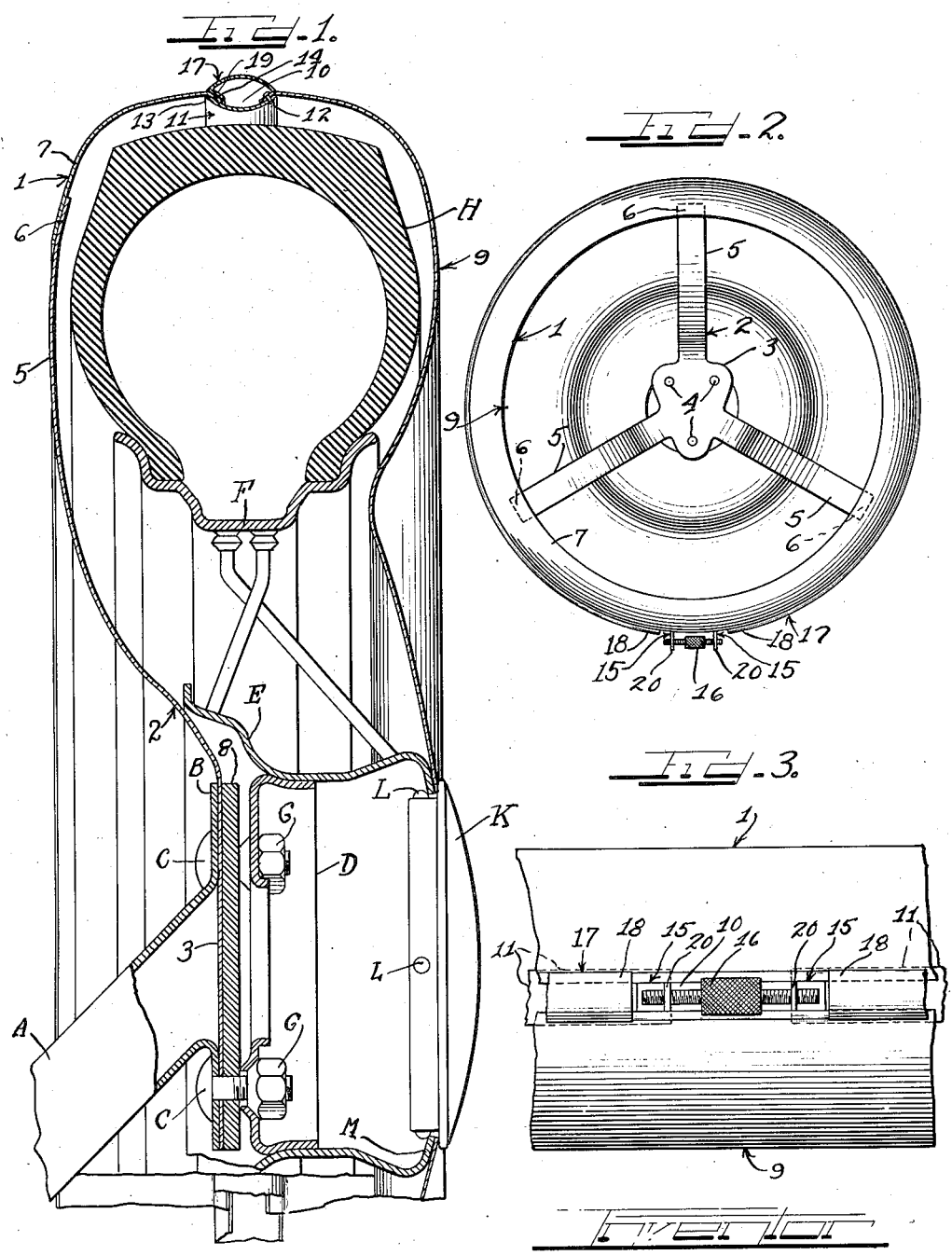

Patented Aug. 4, 1936

2,049,462

UNITED STATES PATENT OFFICE 2,049,462

TIRE COVER CONSTRUCTION

George Albert Lyon, Detroit, Mich., assignor to Lyon Incorporated, Detroit, Mich., a corporation of Delaware Application April 30, 1934, Serial No. 723,050

12 Claims. (Cl. 150—54)

This invention has to do with tire covers and is concerned more particularly with the covering of a spare wheel and tire mounted on a carrier arranged at the rear or either side or other part of an automobile.

It is an object of this invention to provide a tire cover construction including a covering member rigidly supported by the spare wheel carrier and arranged by means of expansible and contractible means to support another cover member.

It is another object of the invention to provide cover members for the front and rear of a tire, embodying means carried by the front cover part whereby the same may be releasably interlocked with and supported by the rear cover member.

It is a further object of the invention to provide cooperating members with means whereby one of the members may be releasably supported by the other member, together with means for concealing the juncture of the members.

The invention contemplates the provision of a relatively rigid rear cover member arranged to be rigidly supported from the spare wheel carrier, together with a front cover member which may be supported from the rear cover member regardless of the presence or absence of the spare wheel and tire.

A further object of the invention resides in the provision of a permanently supported rear cover member and a relatively movable front cover member embodying means whereby the same may be releasably supported by the rear member, together with means whereby the front member may be temporarily supported by the rear member pending the tight interlocking of the members.

It is a further object of the invention to provide a pair of substantially rigid tire cover members and to associate with one of said members a flexible means whereby said one member may be supported by the other member.

In accordance with the general features of the invention, there is provided a preferably completely circular member attached to supporting means which is preferably permanently secured to the spare wheel carrier, and a front cover member of substantially continuous circular form, together with an expansible and contractible ring element secured to one of the members so as not to be restricted substantially in its expansion and contraction. This element is arranged to be telescopically inserted in or passed about the other cover member, means being provided for flexing said element into tight engagement with the telescoped part of the cover member so telescoped. The expanding and/or contracting means may, in accordance with the invention, be arranged within the confines of the cover construction so as to be invisible from the front, access to such means being arranged as by an opening in the rear part of the cover construction.

In accordance with another form of the invention, toggle mechanism for contracting the flexible element may be provided, the tendency of such element to expand serving to cooperate with the toggle mechanism in preventing undesired expansion of said element.

The construction is such that the inner part of the front cover member is arranged to engage the front wall of the spare wheel hub and to be held thereagainst by the flange of the hub cap when the latter is mounted on the hub.

The construction is accordingly extremely simple since it enables the front cover member to be readily interlocked with and released from the stationary rear cover member. Where a flexible element is arranged so as to fit within the rear cover member and be expanded, the juncture of the two cover members may be concealed by a resilient bead element which tends to contract and, in cooperation with the members, is held in place. Such a bead element is preferably arranged in the median plane of the tire so as to enhance the appearance of the cover as a whole.

Further objects and advantages of the invention will appear as the description proceeds.

This invention (in preferred forms) is illustrated in the drawings and hereinafter more fully described.

On the drawings:

Figure 1 is a fragmentary central cross-sectional view of one form of the construction embodying the invention, certain parts being shown for convenience in elevation.

Figure 2 is a rear elevational view of the tire cover construction per se, of Figure 1.

Figure 3 is an enlarged fragmentary bottom plan view of the tightening means and associated structure of Figure 2.

Figure 4 is a fragmentary cross-sectional view similar to the upper part of Figure 1 but showing a modified form of the invention.

Figure 5 is a rear elevational view similar to Figure 2 but showing the construction of Figure 4.

Figure 6 is a view similar to Figure 4 but showing a further form of the invention.

Figure 7 is a view similar to Figure 5, of the construction of Figure 6.

Figure 8 is an enlarged fragmentary sectional view of the tightening means and associated construction at the bottom of Figure 7, looking in the opposite direction relative to Figure 7.

Referring now more particularly to the drawings, Figure 1 illustrates a spare wheel carrier A of an automobile, arranged to be supported by the automobile body or chassis at the rear or either side or any other portion of the vehicle. The carrier A is provided with an attaching flange B carrying a plurality of permanently attached bolts C which project forwardly and are arranged to pass through corresponding openings in the attaching collar D of the hub cap E of the spare wheel F to receive holding nuts G, said nuts, if desired, being also employed to mount the wheel in position to support the vehicle. A spare tire H may be mounted on the spare wheel F, and the regular hub cap K for the hub E may be snapped or otherwise releasably interlocked through its projecting spring or other latches L with the front wall M of the hub.

In accordance with one form of the invention, the tire cover includes a rear member 1 which is preferably in the form of an endless ring as shown in Figure 2 and formed to cover adjacent portions of the tread and rear wall of the tire H. Attaching means of any suitable character for mounting the cover member 1 on the carrier A may be employed. In accordance with this illustrated form of the invention, a spider 2 having a head 3 provided with openings 4 for receiving the studs C and has at least three preferably substantially equally spaced arms 5 radiating from the body and welded at 6 or otherwise suitably secured to the rear portion 7 of the rear cover member 1. An attaching plate 8 is arranged against the front face of the spider head 3 and is also preferably permanently united with the flange B whereby to permanently secure the spider 2 and consequently the rear cover member 1 to the carrier A. The spider 2 thus provides a substantially rigid support for the rear cover member 1.

In accordance with this same form of the invention, the front cover member 9 is preferably formed to substantially conceal the front of the spare wheel F and tire H and to extend rearwardly over the tread of the tire so as to terminate adjacent preferably the median plane of the tire. When thus properly arranged, the cover members 1 and 9 are spaced apart to provide a gap 10. The cover parts 1 and 9 are preferably so dimensioned as to clear the tire, so as to accommodate tires of different sizes and in different conditions of wear. To the end that the gap 10 may be bridged so that the front cover member 9 may be supported from the rear cover member 1, there is provided an expansible and contractible ring 11 which is preferably concavo-convex in cross-section with its concave surface outermost, the cooperating marginal portions of the front and rear cover members being turned inwardly so as to be received within the concavity of the ring 11 as shown in Figure 1. The ring member 11 is split and resilient and is connected to the marginal portion of the front cover member 11 preferably only intermediate its length as shown at 12, either by riveting, brazing or the like. The ring 11 is normally contracted so that the outer diameter of its free or rearmost edge 13 is normally less than the diameter of the edge of the inturned forward margin 14 of the rear cover member 1, so as to freely telescope into and out of the cover member 1. If desired, the normal diameter of the ring 11 may be other than that stated herein above, since in accordance with this form of the invention there is provided in cooperation with the ends of the ring 11 a pair of brackets 15 threadedly receiving the oppositely threaded ends of a turnbuckle 16, whereby the diameter of the edge 13 of the ring 11 may be adjusted as desired.

The ring element 11 serves to bridge the gap 10 interiorly of the cover members. To the end that the gap and associated structure of the cover members and ring 11 may be concealed, a separate substantially C-shaped bead 17 is provided. The bead 17 is split and almost completely circular, the ends 18 thereof terminating adjacent the ends of the turnbuckle 16, leaving the same free to be operated without interference from said ends 18. To assist in holding the bead 17 in position, the same is provided with an inwardly extending flange 19 arranged to lie against the outer surface of the front and inwardly turned margin 14 of the rear cover member 1. The ring member 17 is preferably resilient and outwardly convex and serves to enhance the appearance of the cover as a whole, and is inherently contractible so as to resiliently embrace the cover members 1 and 9 and thereby hold itself in place.

The brackets 15 are provided with outwardly extending lugs 20 through which the ends of the buckle 16 are threaded, said lugs extending outwardly through the gap 10 so as to support the buckle 16 in such a manner as to provide sufficient clearance to enable the buckle to be operated without interference from adjacent cover structure.

The cover member 9 is preferably provided with an opening of substantially the same diameter as the opening in the front wall M of the hub E, so as to permit the skirt of the hub cap K to pass therethrough and thereby hold the cover member 9 centrally on the hub E and centrally with respect to the rear cover member 1 and in telescoped relation to the rear cover member 1. When the front cover member 9 is thus supported by the hub cap K, the operator's entire attention may be devoted to manipulation of the adjusting device 16 for expanding the ring 11 in order to interlock the cover members, and for contracting said ring when it is desired to release the members 1 and 9 from each other.

In the form of the invention appearing in Figures 4 and 5, the rear cover member 21 is in the form of a disc provided with openings 22 corresponding with the openings 4 of Figure 2, whereby the same may be rigidly secured to the carrier A in substantially the same manner in which the spider 2 of Figures 1 and 2 is so mounted. The cover member 21 may be substantially imperforate otherwise so as to substantially cover the entire rear side of the spare wheel and tire H. The front cover member 23 is formed preferably similar to the front cover member 9 of Figures 1 and 2 so as to substantially conceal the front of the spare wheel F and tire H substantially from the opening in the front wall of the hub to the tread of the tire, and is formed also to extend rearwardly substantially entirely across the tread of the tire to terminate somewhat forwardly of the outer periphery of the rear cover member 21. The rear margin 24 of the tread covering portion of the front cover member 23 is inclined outwardly and is received in a concavo-convex split resilient ring 25, the concavity of said ring being innermost. The ring 25 is secured preferably at substantially one point only intermediate its ends to the margin 24 as by rivet means 26, welding, brazing or the like, so as to leave the remaining portions of the ring 25 free to expand and contract.

The ring 25 is of such width as to bridge the gap 27 between the cover members 21 and 23. The ring member 25 accordingly is arranged to overhang the outer peripheral portion of the rear cover member 21. To the end that rattling between the members 21 and 25 may be obviated, a cushion strip 28 of rubber or the like is clinched to the outer margin of the rear cover member 1 so as to be engaged with the inner peripheral surface of the ring 25, the rear margin 29 of the ring 25, when the ring 25 is contracted, being disposed radially inwardly of the outermost portion of the cushion strip 28 so as to prevent withdrawal of the front cover member 23 forwardly from the rear cover member 21.

The hub cap K may be employed in conjunction with the front cover member 23 to cooperate with the same in the manner explained hereinabove in connection with the form of the invention appearing in Figures 1, 2 and 3.

Any suitable means may be employed for contracting the ring 25, such as the toggle mechanism 30 having the brackets 31 thereof secured to the respective ends of the ring 25. The ring member 25 is preferably of such character that it has an inherent tendency to expand, so that the ring cooperates with the toggle mechanism when the latter is in the position shown in Figure 5 to resist any accidental expansion of said ring. If desired, adjusting means such as the device 16 of Figures 1 to 3 could be employed in causing expansion and contraction of the ring 25.

In the form of the invention appearing in Figures 6, 7 and 8, the rear cover member 32 is in the form of a disc similar to the rear cover member 21, having openings 33 in its substantially central portion for attachment preferably permanently to the carrier A in the manner above described. The front cover member 34 is similar to the cover member 23 above described, the outer margins of said cover members, when the cover members are in proper relation to each other, being turned inwardly and in spaced relation to provide a gap 35 which may be bridged by a resilient, transversely concavo-convex, split ring 36. The ring 36 is connected at substantially one point intermediate its ends to the free outer margin of the front cover member 34, as by rivet means 36a, welding, brazing or the like, leaving the remaining portions of the ring member 36 free to flex. The ring 36 is provided with adjusting means 37 whereby said ring may be expanded and contracted at will. The adjusting means 37 includes a turning member 38 having oppositely threaded portions threadedly received in the upstanding lugs 39 of brackets 40 united in any suitable manner as by welding, riveting or the like to the free ends 41 of the ring 36. The rear cover member 32 is so arranged as to provide an opening or window 42 at its bottom, affording ready access to the turning element 38 of the adjusting means 37. The positioning of the front cover member 34 so that the turning element 38 will be arranged substantially as shown in Figures 7 and 8 may be easily effected by positioning the rivet 36a so that it is juxtaposed to a mark 43 on the outer periphery of the rear cover member 32.

The ring member 36 may be contracted sufficiently to bring its rear edge 44 to a diameter less than the diameter of the associated edge 45 of the rear member 32 so as to enable the ring 36 to be readily telescoped with and released from the rear cover member 32. Once the ring 36 is expanded into interlocked telescopic relation with the rear cover member 32, the cover members 32 and 34 are securely interlocked.

With this construction, the adjusting mechanism is entirely concealed from view from the front, and the cover accordingly serves to greatly enhance the appearance of the part of the automobile in connection with which the same is used, as well as the vehicle as a whole.

If desired, a concealing ring similar to the ring 17 of Figure 1 may be employed in conjunction with the juxtaposed margins of the cover members 32 and 34.

While the various front and rear cover members herein illustrated and described may be made discontinuous circularly, they are preferably continuous as illustrated and accordingly may be made of any suitable form-retaining sheet material such as sheet metal, hard rubber, fibre, composition or phenolic condensation product. The various expansible and contractible ring elements and also the concealing ring elements such as the element 17 of Figure 1 are preferably made of resilient sheet metal, although other materials for this purpose may be employed.

The front cover members, while disclosed in each instance as formed with a central opening to receive and be supported by the hub cap K, may, if desired, be made substantially imperforate.

The application and removal of the front cover member, as will be seen from the foregoing, involves substantially a single operation which takes but a moment to perform, yet the interlock between the front and rear cover members may be made firm and positive so as to preclude accidental separation thereof.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a spare wheel carrier and tire cover assembly, a ring member mounted on the carrier and formed to cover a rear peripheral portion of the tire, a member formed to cover a front peripheral portion of the tire, expansible and contractible means associated with the second member and extending rearwardly therefrom, the first member having an inner surface engageable with said means so as to be interlocked therewith, and means associated with said means for expanding the same into firm interlocked engagement with said surface.

2. In a spare wheel carrier and tire cover assembly, a circular member mounted on the carrier and formed to cover a rear peripheral part of the tire, a second circular member formed to cover a forward peripheral part of the tire, leaving a gap between said members, the first member providing at the gap an inturned margin, and an expansible and contractible ring secured to the front member and capable of having a reduced diameter so as to readily telescope said margin and of being thereafter expanded to extend radially outwardly of the inner periphery of said margin to positively interlock with said margin.

3. In a spare wheel carrier and tire cover assembly, a circular member mounted on the carrier and formed to cover a rear peripheral part of the tire, a second circular member formed to cover a forward peripheral part of the tire, leaving a gap between said members, the first member providing at the gap an inturned margin, an expansible and contractible ring secured to the front member and capable of having a reduced diameter so as to readily telescope said margin and of being thereafter expanded to extend radially outwardly of the inner periphery of said margin to positively interlock with said margin, and an expansible and contractible ring substantially circumscribing said gap and engaging adjacent portions of said members so as to substantially conceal the juncture of said members.

4. In a spare wheel carrier and tire cover assembly, a ring member mounted on the carrier and formed to cover a rear peripheral portion of the tire, a member formed to cover a front peripheral portion of the tire, expansible and contractible means associated with the second member and extending rearwardly therefrom, the first member having an inner surface engageable with said means so as to be interlocked therewith, and means associated with said means for expanding the same into firm interlocked engagement with said surface, the second means including brackets extending outwardly from the first means so as to be clear of the cover members to enable the second means to be readily manipulated.

5. In a spare wheel carrier and tire cover assembly, a ring member mounted on the carrier and formed to cover a rear peripheral portion of the tire, a member formed to cover a front peripheral portion of the tire, expansible and contractible means associated with the second member and extending rearwardly therefrom, the first member having an inner surface engageable with said means so as to be interlocked therewith, means associated with said means for expanding the same into firm interlocked engagement with said surface, the second means including brackets extending outwardly from the first means so as to be clear of the cover members to enable the second means to be readily manipulated, and an expansible and contractible ring substantially circumscribing the juncture of said members so as to substantially conceal the same, said ring being split and so formed that, when thus disposed, the distance between its ends is greater than the circumferential extent of the second means, to allow the second means to project between and clear of said ends.

6. In a spare wheel carrier and tire cover assembly, a member mounted on the carrier and formed to cover a rear peripheral part of the tire, a second member formed to cover a forward peripheral part of the tire, and an expansible and contractible connecting ring carried by one of said members to form a unit therewith and capable of telescoping the other member and means for flexing and positively interlocking said ring with said other member, said second member extending radially inward and being formed to be secured centrally of the assembly so as to aid in holding the cover in a centered position about the tire.

7. In a spare wheel carrier and tire cover assembly, a member mounted on the carrier and formed to cover a rear peripheral part of the tire, a second member formed to cover a forward peripheral part of the tire, leaving a gap between said members, connecting ring means for bridging said gap and holding said members in proper covering relation to the tire, and an expansible and contractible ring for substantially circumscribing and shielding said means and the juncture of said members.

8. In a spare wheel carrier and tire cover assembly, a member mounted on the carrier and formed to cover a rear peripheral portion of the tire, a member formed to cover a forward peripheral portion of the tire, expansible and contractible connecting means flexible relative to said members and carried by one of said members, and interlockable with an inner surface of the other member, and means associated with the first means for expanding said first means into firm interlocked relation with said surface.

9. In a spare wheel carrier and tire cover assembly, a member mounted on the carrier and formed to cover a rear peripheral portion of the tire, a member formed to cover a forward peripheral portion of the tire, means for connecting said members, and a ring substantially circumscribing the juncture of said members so as to substantially shield said members and means, said ring providing a space affording access to said means so that said means may be manipulated without necessitating disturbance of said ring.

10. In a spare wheel and tire cover assembly, a member formed to cover a rear peripheral part of the tire, a second member formed to cover a forward peripheral part of the tire, leaving a gap between said members, connecting ring means for bridging said gap and holding said members in proper covering relation to the tire, and an expansible and contractible ring for substantially circumscribing and shielding said means and the juncture of said members.

11. In a spare wheel and tire cover assembly, a member formed to cover a rear peripheral portion of the tire, a member formed to cover a forward peripheral portion of the tire, expansible and contractible connecting means flexible relative to said members and carried by one of said members, and interlockable with an inner surface of the other member, and means associated with the first means for expanding said first means into firm interlocked relation with said surface.

12. In a spare wheel and tire cover assembly, a member formed to cover a rear peripheral portion of the tire, a member formed to cover a forward peripheral portion of the tire, means for connecting said members, and a ring substantially circumscribing the juncture of said members so as to substantially shield said members and means, said ring providing a space affording access to said means so that said means may be manipulated without necessitating disturbance of said ring.

GEORGE ALBERT LYON.